(12) United States Patent
Prins

(10) Patent No.: US 7,471,280 B2
(45) Date of Patent: Dec. 30, 2008

(54) TACTILE DEVICE

(75) Inventor: Menno Willem Jose Prins, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 721 days.

(21) Appl. No.: 10/517,915

(22) PCT Filed: Jun. 4, 2003

(86) PCT No.: PCT/IB03/02449

§ 371 (c)(1),
(2), (4) Date: Dec. 14, 2004

(87) PCT Pub. No.: WO04/001943

PCT Pub. Date: Dec. 31, 2003

(65) Prior Publication Data

US 2005/0239191 A1    Oct. 27, 2005

(30) Foreign Application Priority Data

Jun. 19, 2002  (EP) .................................. 02077426

(51) Int. Cl.
*G09G 5/00* (2006.01)

(52) U.S. Cl. ........................ 345/156; 345/184; 434/113; 434/114

(58) Field of Classification Search ................ 345/156, 345/184; 434/113–114
See application file for complete search history.

(56) References Cited

U.S. PATENT DOCUMENTS

| 2,416,978 | A |  | 3/1947 | Burgess |
| 5,496,174 | A |  | 3/1996 | Garner |
| 5,580,251 | A | * | 12/1996 | Gilkes et al. ................. 434/113 |
| 6,509,892 | B1 | * | 1/2003 | Cooper et al. ............... 345/173 |
| 7,016,560 | B2 | * | 3/2006 | Ticknor et al. ................ 385/16 |

FOREIGN PATENT DOCUMENTS

| GB | 2212336 A | 7/1989 |
| WO | WO0239642 A2 | 5/2002 |
| WO | WO0239642 A3 | 5/2002 |

OTHER PUBLICATIONS

M.W.Prins, et. al.: Fluid Control in Multichannel Structrures by Electrocapillary Pressure; vol. 291 pp. 277-280; Jan. 2001.
H.J.J. Verheijen et. al.: Contact Angles and Wetting Velocity Measured Electrically; vol. No. 70/9 pp. 3668-3673; 1999.

* cited by examiner

Primary Examiner—Richard Hjerpe
Assistant Examiner—Leonid Shapiro
(74) Attorney, Agent, or Firm—Michael E. Belk

(57) ABSTRACT

The invention relates to a tactile device provided with a number of fluid elements (1) containing an electrically conducting fluid (3, 4). The fluid level in each element is movable by actuator means (V, 6) applying a electric power to said fluid elements. Each fluid element is in contact with the fluid for perception of the fluid level by a user. The fluid elements comprise capillary tubes (2) in which the fluid level is movable as a result of electro-capillary pressure.

20 Claims, 1 Drawing Sheet

TACTILE DEVICE

Figure 1:
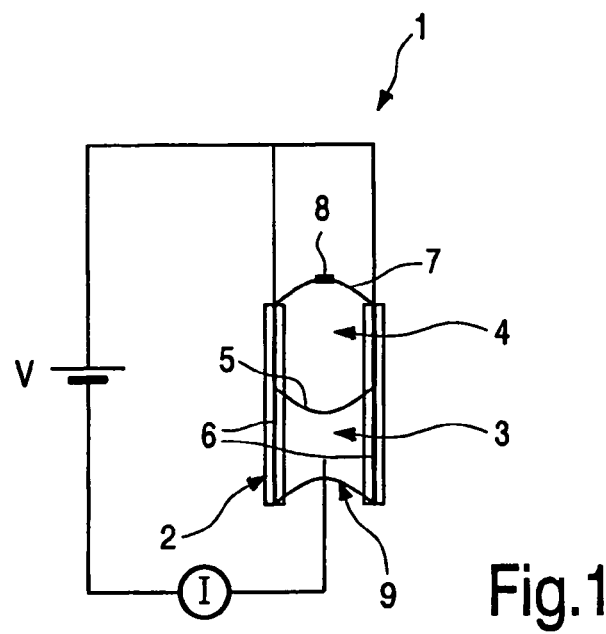

The present invention relates to a tactile device provided with a number of fluid elements containing an electrically conducting fluid, the fluid level in each element being movable, actuator means for moving the fluid level of a number of selected fluid elements by applying an electric force to said fluid elements, wherein each fluid element is provided with a tactile element that is in contact with the fluid for perception of the fluid level by a user.

In general tactile devices are arranged to transfer information by activating the user's feeling of touch. Several types of tactile devices are known in practice. For example one type of tactile devices is arranged to provide force-feedback in joysticks, mice, control pads and the like or to vibrate mobile phones. Another type of tactile devices is for instance applied in brail reading machines to transfer more complex information.

A device of the type as described above is known from GB 2 212 336. The known device comprises a number of fluid chambers filled with liquid crystal. Each of the chambers comprises a pair of sleeves acting as electrodes for applying an electric field to the fluid in order to change the fluid level using the Maxwell-Faraday effect. A piston pin floating on the fluid acts as a feeler indicating the fluid level. The known device forms part of a brail reading machine.

The known device has the disadvantage that it consumes a lot of electric power. Furthermore the movable mechanical pins appear to be noisy. In practice the known device has shown lack of reliability combined with high costs.

It is an object of the invention to provide a device of the type as described above that solves these problems.

The device according to the invention is therefore characterized in that the fluid elements comprise capillary tubes in which the fluid level is movable as a result of electro-capillary pressure.

Application of capillary tubes using electro-capillary pressure allows the fluid level to be changed sufficiently with a minimal amount of electric power. The device according to the invention may comprise as many fluid elements as necessary depending on the application and still be dynamic and easily programmable. Since the size of the fluid elements can be kept small, a total of 100×100 cells can fit into and can thus address the palm of a hand.

In a first preferred embodiment of the tactile device according to the invention the actuator means are arranged to vibrate the tactile element for a predetermined period of time when the fluid level has changed to a new position. The feeling of touch of the user is thereby activated in a natural way thereby improving the quality of information transfer to the user.

According to a further preferred embodiment the tactile element comprises a diaphragm of flexible material. The diaphragm can be moved rapidly and silently allowing a reliable and fast transfer of information without unwanted noise.

Preferably the diaphragm is provided with at least one contact spot to enhance the tactile feeling of the user.

In another preferred embodiment one or more capillary tubes are provided at the opposite end with a further diaphragm of flexible material. The capillary tubes are now separated so crosstalk is effectively avoided.

In yet another preferred embodiment the actuator means are arranged for setting the fluid level of a number of selected capillary tubes at a predetermined prestressed level and the tactile device further comprises detector means which are arranged for detecting a change of fluid level in the selected capillary tubes. In this embodiment the tactile device may advantageously also function as a sensor picking up signals from the user.

In a practical embodiment the detector means are arranged for detecting a change of electric capacitance in the selected capillary tubes. Using this type of detector means the tactile device can advantageously be built in a compact form.

According to a further preferred embodiment one or more capillary tubes comprise a first fluid and a second fluid having different electrical conductivities, the fluids being essentially immiscible. This embodiment allows a voltage-dependent pressure to be applied to the capillary tubes to control the degree of movement of the tactile element. In a further detailed embodiment thereof either the first or the second fluid is electrically conducting and the other fluid, the second or first fluid, respectively, is electrically insulating. The range of movement is thereby maximal resulting in optimal sensitivity of the tactile device.

According to a practical embodiment the actuator means comprise an electrical power source and a number of electrodes. In these embodiments the actuator means are formed by a minimal amount of components that are reliable and relatively cheap.

Preferably the detector means comprise a voltage source and a current measurement device. Since a voltage source is already present only a current measurement device needs to be added to realize the sensor function provided for by the detector means.

Preferably one or more capillary tubes comprise at least one electrode that is attached to the wall of the capillary tube.

Figure 2:
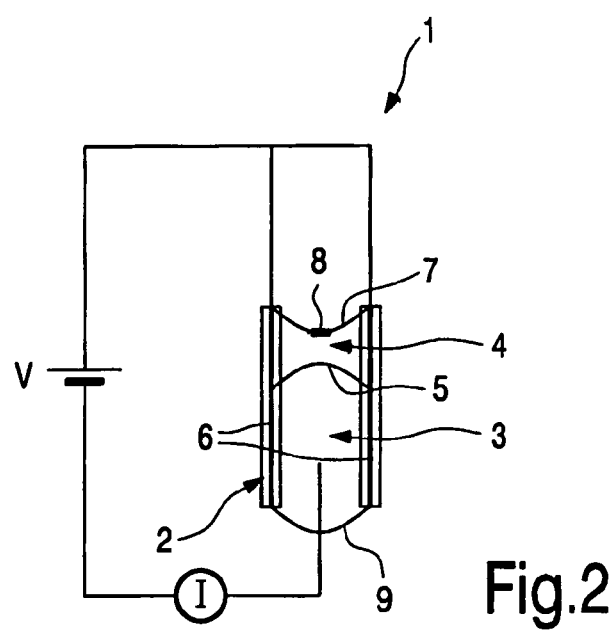
Figure 3:
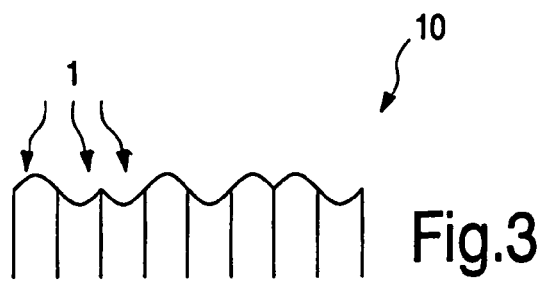

The invention will be further explained by means of the attached drawing, in which:

FIG. 1 schematically shows a preferred embodiment of a fluid element as part of the device according to the invention in a first state;

FIG. 2 schematically shows the fluid element of FIG. 1 in a second state;

FIG. 3 schematically shows a preferred embodiment device according to the invention.

In all Figures equal objects are denoted by equal reference numerals.

FIG. 1 and FIG. 2 schematically show a preferred embodiment of a fluid element 1 as part of the device according to the invention. Fluid element 1 comprises a capillary tube 2 filled with a first electrically conducting fluid 3. On top of the conducting fluid lies an electrically insulating fluid 4. Fluids 3 and 4 are essentially immiscible, which is indicated by means of the fluid/fluid meniscus 5. In an alternative embodiment fluid 3 is electrically insulating, while fluid 4 is electrically conducting. Examples of suitable electrically conducting fluids are aqueous solutions. Examples of suitable electrically insulating fluids are a gas or a nonpolar oil.

Actuator means are provided for applying electric power to the capillary tube 2. As a result thereof an electro-capillary pressure is introduced causing a change in the fluid level of the capillary tube. The actuator means comprise an electrical power source V and a number of electrodes 6. In the preferred embodiment shown one electrode 6 is integrated in the wall of each capillary tube 2. The electrode 6 comprises a layer of conducting material. An insulating layer as well as a hydrophobic coating may be added thereto.

Each capillary tube 2 is provided with a tactile element 7 that is in contact with the fluid for perception of the fluid level by a user. The tactile element comprises a diaphragm 7 of flexible material on top of the fluid essentially closing the capillary tube 2 at one end thereof. In the preferred embodiment the diaphragm 7 comprises a flexible foil. A suitable material is a flexible plastic. The flexible foil is glued or sealed to the walls of the capillary tube. The diaphragm 7 is provided with a contact spot 8 of a more rigid material, for instance a more rigid plastic. The contact spot 8 is smaller than the diaphragm 7 and may have any shape, such as a dot or a disc.

When by means of the power source V and the electrode 6 an electric power is applied to the capillary tube 2, an electro-capillary pressure is introduced by means of which the fluid level can be manipulated. A change of fluid level directly results in a change of position of the diaphragm 7. As an illustration thereof two different situations are shown in FIGS. 1 and 2. In FIG. 1 the capillary tube 2 is shown in a first state, wherein the diaphragm 7 is bent upwards. In FIG. 2 the capillary tube 2 is shown in a second state, wherein the diaphragm 7 is bent downward. The diaphragm 7 functions as a feeler transferring information to a user based on the activation of the feeling of touch.

It is noted that the phenomenon of electro-capillary pressure is known per se in the field. In short the capillary pressure on the fluid/fluid meniscus 5 is determined by the difference between two interfacial tensions. On the one hand the tension of the interface between the wall of the capillary tube 2 and the conducting fluid 3 and on the other hand the tension of the interface between the wall of the capillary tube 2 and the insulating fluid 4. The tension influences the position of the fluid/fluid meniscus 5 and therefore also the position of the diaphragm 7. For a more detailed discussion of the phenomenon of electro-capillary pressure reference is made to the article "Fluid Control in Multichannel Structures by Electro capillary Pressure", by Prins et al, Science, Volume 291, 12 Jan. 2001, which is incorporated herein by reference.

The actuator means V, 6 are arranged to vibrate the diaphragm 7 for a predetermined period of time. Typically the vibration is applied when the diaphragm 7 has reached another state due to a change in fluid level. The vibration activates the feeling of touch in a more natural way. Many suitable actuator means for this task are available to a person skilled in the art, such as means for oscillating the voltage provided by the power source V during said time period.

FIG. 3 schematically shows a device 10 comprising an array of capillary tubes 2 according to the invention. The position of each of the diaphragms 7 depends on the voltage applied to the corresponding capillary tube 2. In the example shown device 10 consists of one row of only eight capillary tubes 2. It will be understood that the number and configuration of the capillary tubes in the device according to the invention may vary. Preferably the capillary tubes in the device are arranged in a matrix configuration. In practice the number of capillary tubes is limited only by practical restrictions, such as the size of the device and the number of electrical connections. Since the fluid elements comprise micro channels, such as capillary tubes, of inherently small size, the device according to the invention may comprise a large number of fluid elements and still be easy to handle. A threshold-like behaviour of the capillary tubes can be achieved by changing the physical characteristics of the capillary tubes. By designing the capillary tubes such that the physical characteristics thereof induce threshold-like behaviour, extra components, such as transistors or diodes, become redundant. This further reduces the size of the device according to the invention. In published international patent application WO 02/39462 A2, which is incorporated herein by reference, an example of a device comprising a matrix of capillary tubes having segmented electrodes showing a threshold-like behaviour is described.

The number of electrical connections can be advantageously reduced by applying the method of matrix addressing that is known per se in the field. If every capillary is connected to an individual wire, the number of required electronic control elements scales with $N^2$. A well-known method to reduce the number of control elements to a number of the order N, is by matrix addressing. Matrix addressing means that rows (indexed i, i$\in\{1, \ldots, N\}$, voltage $V_i$) are activated one-by-one while the programming signals are placed on column wires (indexed j, j$\in\{1, \ldots, N\}$, voltage $V_j$). In order to apply matrix addressing in a tactile device an electrical matrix structure is needed in every capillary tube, i.e. every capillary tube (i, j) needs to be connected to voltages $V_i$ and $V_j$. In the cited WO 02/39462 A2 three examples thereof are shown.

In addition to the actuator function described above the device according to the invention can also function as a sensor. Thereto detector means comprising a voltage source and a current measurement device I are connected to each capillary tube 2 for detecting a change of electric capacitance. When the position of the diaphragm 7 is changed actively, for instance by pressure exerted thereon by a user, this will result in a change of electric capacitance in the corresponding capillary tube 2, which will be detected by the detector means. The electrical power source V can serve as the voltage source for instance providing a voltage ripple or a voltage pulse. By measuring the current using device I any change of electric capacitance can be detected. Information can now be transferred to the device simply by exerting pressure on the diaphragm 7 of one or more selected capillary tubes 2. The diaphragms need to be prestressed to a sufficient extent that can elegantly be provided for by the actuator means. Detector means for detecting a change of electric capacitance are described in more detail in the articles: "Contact angles and wetting velocity measured electrically", by H. J. J. Verheijen and M. W. J. Prins, Rev. Sci. Instr. 70(9), 3668-73 (1999), and 'Fluid control in multichannel structures by electro capillary pressure', by M. W. J. Prins, W. J. J. Welters, and J. W. Weekamp, Science 291(5502), 277-280 (2001). Many suitable alternative detector means, such as means for optical detection of deformation of the diaphragm 7 or the meniscus 5, are also available to a person skilled in the art.

In device 10 each capillary tube 2 is closed at the bottom by means of a second diaphragm 9. Diaphragm 9 may have the same characteristics as diaphragm 7. The capillary tubes 2 are thus separate entities and hydrostatic crosstalk is prevented sufficiently. Alternatively, the capillary tubes may use a shared reservoir of the first fluid. Although the production costs will probably be lower, crosstalk is inevitable making the alternative embodiment useful only for certain less critical applications. In both embodiments a certain under pressure in the fluid is useful, such that the diaphragm 9 has not yet reached its most upward bent position. Various means for creating under pressure are available to a person skilled in the art, such as a hydrophobic coating on the wall of the capillary tubes.

In general the device according to the invention refers to a tactile device using capillary tubes, in which the fluid level is to be manipulated by electro-capillary pressure, to transfer information. The tactile device either functions as an actuator or as a sensor or as a combination thereof.

The tactile device can be used for a wide variety of applications some of which will be mentioned here. A first application is as a communication device, especially to provide additional information in a situation where the visual system is already overloaded, for instance in airplanes, operating rooms, vehicles etc. A second application is a virtual reality device, such as a glove that provides full tactile sensation over the palm and fingertips of the user. Other applications may be a telerobotic manipulator or an electronic book for the visually impaired.

The invention is of course not limited to the embodiments described or shown, but generally extends to any embodiment, which falls within the scope of the appended claims as seen in the light of the above description and drawings.

The invention claimed is:

1. A tactile device provided with a number of fluid elements, each fluid element containing a first fluid and a second fluid having different electrical conductivities and being essentially immiscible, a fluid level between the first fluid and the second fluid in each element being movable, and actuator means for moving the fluid level of a number of selected fluid elements by applying an electric force to said fluid elements, wherein each fluid element is at one end provided with a tactile element that is in contact with the fluid for perception of the fluid level by a user, characterized in that the fluid elements comprise one or more capillary tubes in which either the first fluid or the second fluid is electrically conducting and the other fluid, the second or the first fluid, respectively, is electrically insulating, and the fluid level is movable as a result of electro-capillary pressure.

2. A tactile device according to claim 1, wherein the actuator means are arranged to vibrate the tactile element for a predetermined period of time.

3. A tactile device according to claim 1, wherein the tactile element comprises a diaphragm of flexible material.

4. A tactile device according to claim 3, wherein the diaphragm is provided with at least one contact spot.

5. A tactile device according claim 1, wherein said one or more capillary tubes are provided with a further diaphragm of flexible material at an end thereof which is opposite to the one end provided with the tactile element.

6. A tactile device according to claim 1, wherein the actuator means comprise an electrical power source and a number of electrodes.

7. A tactile device provided with a number of fluid elements containing an electrically conducting fluid, a fluid level in each element being movable, actuator means for moving the fluid level of a number of selected fluid elements by applying an electric force to said fluid elements, wherein each fluid element is at one end provided with a tactile element that is in contact with the fluid for perception of the fluid level by a user, characterized in that the fluid elements comprise capillary tubes in which the fluid level is movable as a result of electro-capillary pressure, wherein the actuator means are arranged for setting the fluid level of a number of selected capillary tubes at a predetermined prestressed level and wherein the device further comprises detector means that are arranged for detecting a change of fluid level in the selected capillary tubes.

8. A tactile device according to claim 7, wherein the detector means are arranged for detecting a change of electric capacitance in the selected capillary tubes.

9. A tactile device according to claim 7, wherein one or more capillary tubes comprise a first fluid and a second fluid having different electrical conductivities, the fluids being essentially immiscible.

10. A tactile device according to claim 9, wherein either the first fluid or the second fluid is electrically conducting and the other fluid, the second or first fluid, respectively, is electrically insulating.

11. A tactile device according to claim 7, wherein the detector means comprise a voltage source and a current measurement device.

12. A tactile device according to claim 7, wherein the actuator means are arranged to vibrate the tactile element for a predetermined period of time.

13. A tactile device according to claim 7, wherein the tactile element comprises a diaphragm of flexible material.

14. A tactile device according to claim 13, wherein the diaphragm is provided with at least one contact spot.

15. A tactile device according claim 7, wherein said one or more capillary tubes are provided with a further diaphragm of flexible material at an end thereof which is opposite to the one end provided with the tactile element.

16. A tactile device provided with a number of fluid elements containing an electrically conducting fluid, a fluid level in each element being movable, actuator means for moving the fluid level of a number of selected fluid elements by applying an electric force to said fluid elements, wherein each fluid element is at one end provided with a tactile element that is in contact with the fluid for perception of the fluid level by a user, characterized in that the fluid elements comprise capillary tubes in which the fluid level is movable as a result of electro-capillary pressure, wherein the actuator means comprise an electrical power source and a number of electrodes, wherein one or more capillary tubes comprise at least one electrode that is attached to the wall of the capillary tube.

17. A tactile device according to claim 16, wherein the detector means are arranged for detecting a change of electric capacitance in the selected capillary tubes.

18. A tactile device according to claim 16, wherein one or more capillary tubes comprise a first fluid and a second fluid having different electrical conductivities, the fluids being essentially immiscible.

19. A tactile device according to claim 16, wherein either the first fluid or the second fluid is electrically conducting and the other fluid, the second or first fluid, respectively, is electrically insulating.

20. A tactile device according to claim 16, wherein the detector means comprise a voltage source and a current measurement device.

* * * * *